US010352800B2

(12) United States Patent
Tadigadapa et al.

(10) Patent No.: US 10,352,800 B2
(45) Date of Patent: Jul. 16, 2019

(54) MICROMACHINED BULK ACOUSTIC WAVE RESONATOR PRESSURE SENSOR

(71) Applicant: MKS Instruments, Inc., Andover, MA (US)

(72) Inventors: Srinivas Tadigadapa, State College, PA (US); Nishit Goel, State College, PA (US); Stephen Bart, West Newton, MA (US)

(73) Assignee: MKS Instruments, Inc., Andover, MA (US)

(*) Notice: Subject to any disclaimer, the term of this patent is extended or adjusted under 35 U.S.C. 154(b) by 184 days.

(21) Appl. No.: 15/602,758

(22) Filed: May 23, 2017

(65) Prior Publication Data
US 2017/0350779 A1 Dec. 7, 2017

Related U.S. Application Data

(60) Provisional application No. 62/345,180, filed on Jun. 3, 2016.

(51) Int. Cl.
G01L 9/00 (2006.01)
(52) U.S. Cl.
CPC ............ *G01L 9/008* (2013.01); *G01L 9/0022* (2013.01); *G01L 9/0047* (2013.01)
(58) Field of Classification Search
None
See application file for complete search history.

(56) References Cited

U.S. PATENT DOCUMENTS

| 4,507,170 A | 3/1985 | Myhre |
| 4,656,707 A | 4/1987 | Berte et al. |
| 5,235,240 A | 8/1993 | Morita |

(Continued)

FOREIGN PATENT DOCUMENTS

| DE | 4414926 | 11/1995 |
| EP | 0484545 | 5/1991 |

(Continued)

OTHER PUBLICATIONS

International Search Report and Written Opinion from corresponding PCT Application No. PCT/US2017/034987, International Filing Date May 30, 2017, dated Aug. 25, 2017.

(Continued)

Primary Examiner — Peter J Macchiarolo
Assistant Examiner — Jermaine L Jenkins
(74) Attorney, Agent, or Firm — Burns & Levinson, LLP; Joseph M. Maraia; Steven M. Mills

(57) ABSTRACT

A pressure sensor includes a piezoelectric substrate having a generally planar structure and an anchor location fixing the piezoelectric substrate at the periphery of the planar structure of the piezoelectric substrate. The planar structure of the piezoelectric substrate has a first region having a first characteristic thickness adjacent to the anchor location, and a second region have a second characteristic thickness at a middle region of the substrate. The second characteristic thickness is less than the first characteristic thickness such that the planar structure in the second region is displaced relative to the neutral axis of the planar structure such that while undergoing bending the second region has either mostly compressive or mostly tensile stress.

22 Claims, 9 Drawing Sheets

(56) References Cited

U.S. PATENT DOCUMENTS

| | | | | |
|---|---|---|---|---|
| 5,969,257 A * | 10/1999 | De Bortoli | ............ | G01L 9/008 |
| | | | | 310/338 |
| 6,507,187 B1 * | 1/2003 | Olivas | ...................... | G01B 7/24 |
| | | | | 324/207.21 |
| 7,199,510 B2 * | 4/2007 | Umeki | ................... | H03H 9/132 |
| | | | | 310/320 |
| 7,284,439 B2 * | 10/2007 | Jonsson | ................ | G01L 9/0073 |
| | | | | 73/724 |
| 8,256,306 B1 * | 9/2012 | Bauer | ................... | G01L 1/2231 |
| | | | | 73/862.474 |
| 9,762,204 B2 * | 9/2017 | Aastrup | .................. | G01N 9/002 |
| 9,963,340 B2 * | 5/2018 | Brown | .................. | B81B 3/0051 |
| 2014/0352445 A1 | 12/2014 | Kuisma | | |
| 2016/0003697 A1 | 1/2016 | Okamoto et al. | | |
| 2016/0146680 A1 * | 5/2016 | Bao | ......................... | E21B 47/06 |
| | | | | 73/862.59 |

FOREIGN PATENT DOCUMENTS

| | | |
|---|---|---|
| EP | 2058639 | 5/2009 |
| GB | 2087558 | 5/1982 |
| TW | 201506370 | 2/2015 |
| WO | 2004072622 | 8/2004 |

OTHER PUBLICATIONS

Office Action in corresponding Taiwanese application No. 106118184, dated Apr. 16, 2018; 6 pages.

* cited by examiner

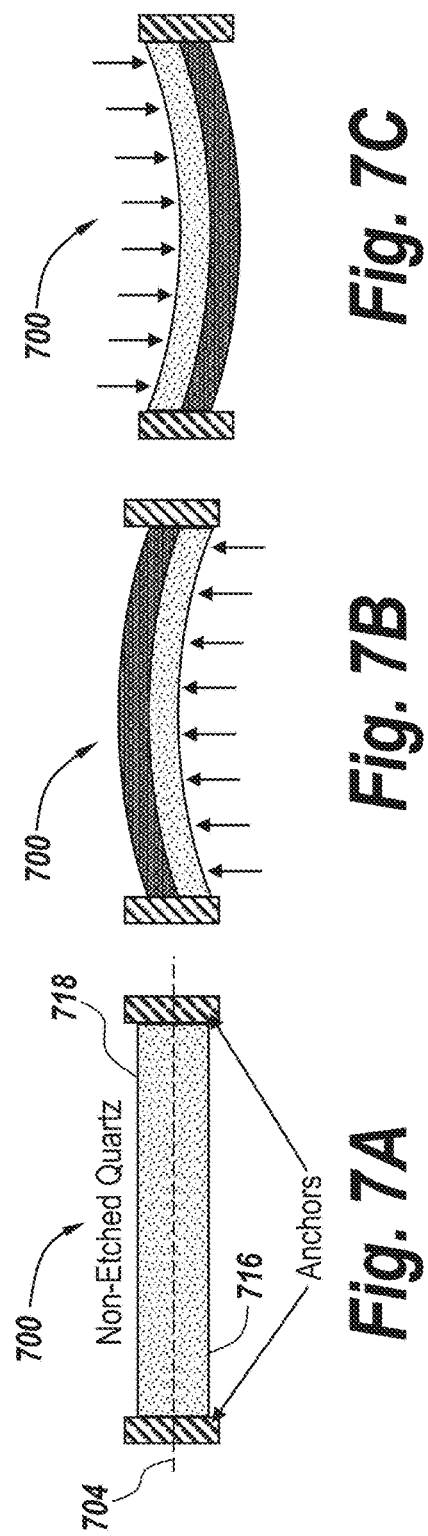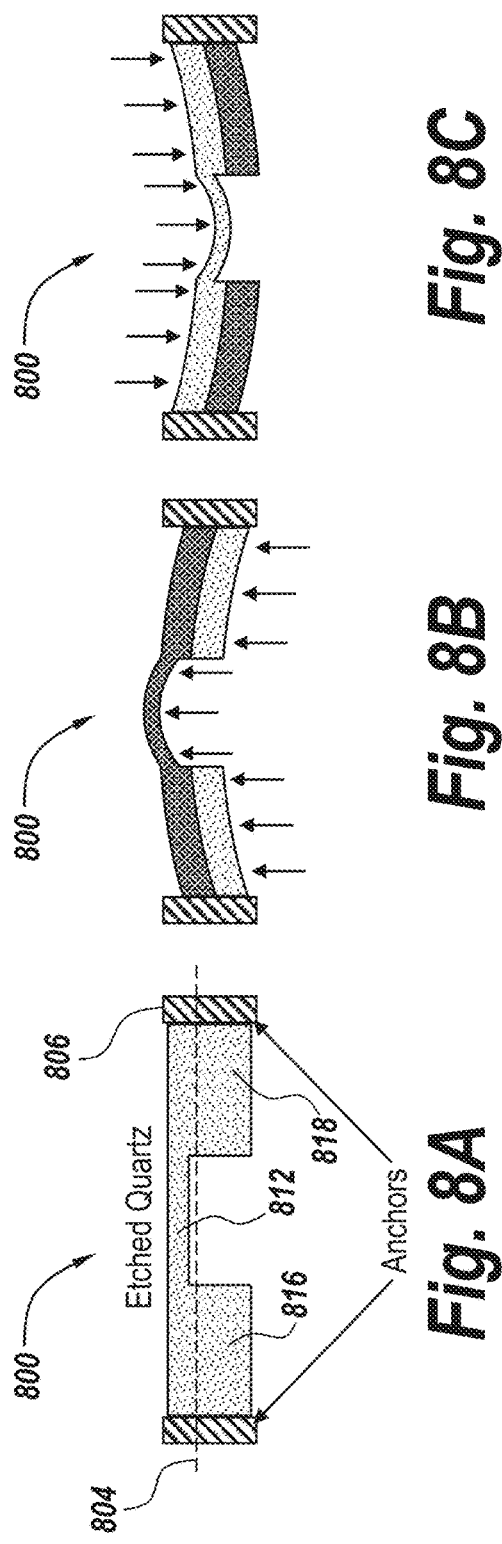

MICROMACHINED BULK ACOUSTIC WAVE RESONATOR PRESSURE SENSOR

CROSS-REFERENCE TO RELATED APPLICATIONS

This application claims priority to and benefit of U.S. Provisional Application No. 62/345,180, filed Jun. 3, 2016, entitled MICROMACHINED BULK ACOUSTIC WAVE RESONATOR PRESSURE SENSOR, the contents of which are incorporated herein by reference in their entirety for all purposes.

FIELD

This disclosure relates generally to pressure sensors for measuring the pressure of fluids (i.e., a gas or liquid) and, in particular, to pressure sensors using quartz resonators.

BACKGROUND

Pressure sensors can be used to measure the pressure of a fluid. For example, some conventional pressure sensors have been fabricated using commercially available bulk quartz resonators. Quartz is a piezoelectric crystal having highly stable elastic properties with low intrinsic losses. Because of these properties, quartz has been widely utilized in precision frequency control applications, such as timing and clocking for electronic instruments.

Despite having a very precise oscillation frequency, the resonance frequency of quartz is also very sensitively affected by a variety of environmental disturbances such as external forces, bending, compression, mass loading and acceleration. The fractional deviation of the resonance frequency from its original value $f_0$ is given by $\Delta f/f_0$. One frequency shifting mechanism in quartz resonator sensors occurs when a force is applied along the radial direction at the periphery of a circularly shaped thickness-shear-mode (TSM) quartz resonator. The quartz sensor produces a frequency shift proportional to the amplitude of the applied force. This phenomenon is defined as the force-frequency effect.

Notably, quartz is sensitive not only to in-plane radial forces, but also to transverse forces and flexural bending. Thus, transverse forces may be induced by several means in order to exploit quartz as a pressure sensor. However, current pressure sensors using quartz resonators are only suitable for very high pressure measurements, typically at pressure levels of about one atmosphere and above. Current quartz pressure sensors are also unable to effectively measure pressure over a wide pressure range.

SUMMARY

Embodiments described herein relate to pressure sensors that use micromachining and microfabrication methods to fabricate piezoelectric resonator-based vacuum pressure sensors that are able to provide high pressure measurement sensitivity over a wide pressure range (e.g., from one atmosphere down to $10^{-6}$ Torr). Particular placement of the resonator electrodes enables the sensors to achieve high sensitivity and to effectively compensate for common mode signals to improve the signal-to-noise ratio by providing for background and ambient noise compensation and noise reduction. Flexural sensitivity of a micromachined AT-cut quartz thin plate resonator is used to accurately sense vacuum pressure as a result of applying a differential pressure across the resonator. The transverse loading created in the sensor by the differential pressure results in an out-of-plane bending of the sensor and thus results in resonator frequency shift.

Embodiments of the pressure sensor of this disclosure include a piezoelectric substrate having a generally planar structure and a neutral axis, an upper electrode on the planar structure and a lower electrode on the planar structure to drive the resonance of the piezoelectric substrate and sense the frequency of the piezoelectric substrate. The sensor also includes an anchor location fixing the piezoelectric substrate to a fixture at the periphery of the planar structure of the piezoelectric substrate. The planar structure of the piezoelectric substrate has a first region having a first characteristic thickness adjacent to the anchor location, and a second region have a second characteristic thickness at a middle region of the substrate. The second characteristic thickness is less than the first characteristic thickness such that the planar structure in the second region is displaced relative to the neutral axis of the planar structure. This ensures that, while undergoing bending, the second region has either mostly compressive or mostly tensile stress.

In other embodiments, the sensor is fabricated using micromachining technologies. In embodiments, the substrate is an AT-cut quartz substrate. In embodiments, both of the upper electrode and the lower electrode are made of gold. In embodiments, the substrate is fixed to the fixture using silicone rubber cement. In embodiments, the second region is formed by a dry etch process. In embodiments, a diameter of the second region is equal to or less than 1 cm and the characteristic thickness of the second region is less than about 100 μm. In embodiments, the sensed frequency is equal to or greater than 100 MHz. In embodiments, the sensor is a MEMS device.

Further embodiments of the pressure sensor of this disclosure include a bulk acoustic wave resonator pressure sensor including a diaphragm. In embodiments, the diaphragm includes a substrate having a first surface and a second surface opposite the first surface. A portion of the first surface is etched to a pre-selected depth. In embodiments, the sensor also includes a first electrode deposited and patterned on the first surface and a second electrode deposited and patterned on the second surface. In embodiments, the first and second electrodes are configured to measure changes in an at-resonance impedance characteristic of the pressure sensor.

In yet further embodiments, the substrate is an AT-cut quartz substrate. In embodiments, a thickness of an unetched portion of the substrate is about 100 μm. In embodiments, the pre-selected etch depth is about 63 μm or about 80 μm. In embodiments, the first and second electrodes comprise gold and are deposited and patterned using a photolithographic process. In embodiments, the sensor is fabricated using micromachining technology. In embodiments, pressure applied to the first and second surfaces causes deflection and stress of the diaphragm, the deflection and stress being non-symmetric through a thickness of the diaphragm. In embodiments, the diaphragm is mostly tensile for a net pressure applied to the second surface, and mostly compressive for a net pressure applied to the first surface. In embodiments, the sensor is a MEMS device.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

The disclosure will be more fully understood by reference to the detailed description, in conjunction with the following figures, wherein:

FIGS. 7A-C show a uniformly thick diaphragm being deflected by a pressure on the lower and upper faces of a non-etched quartz sensor, according to an illustrative embodiment.

FIGS. 8A-C show a non-uniformly thick diaphragm being deflected by a pressure on the lower and upper face, according to an illustrative embodiment.

DETAILED DESCRIPTION

In the description that follows, the components, steps, features, objects, benefits, and advantages discussed are merely illustrative. None of them, nor the discussions relating to them, are intended to limit the scope of protection in any way. Numerous other embodiments are also contemplated. These include embodiments that have fewer, additional, and/or different components, steps, features, objects, benefits, and advantages. These also include embodiments in which the components and/or steps are arranged and/or ordered differently. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Figure 1:
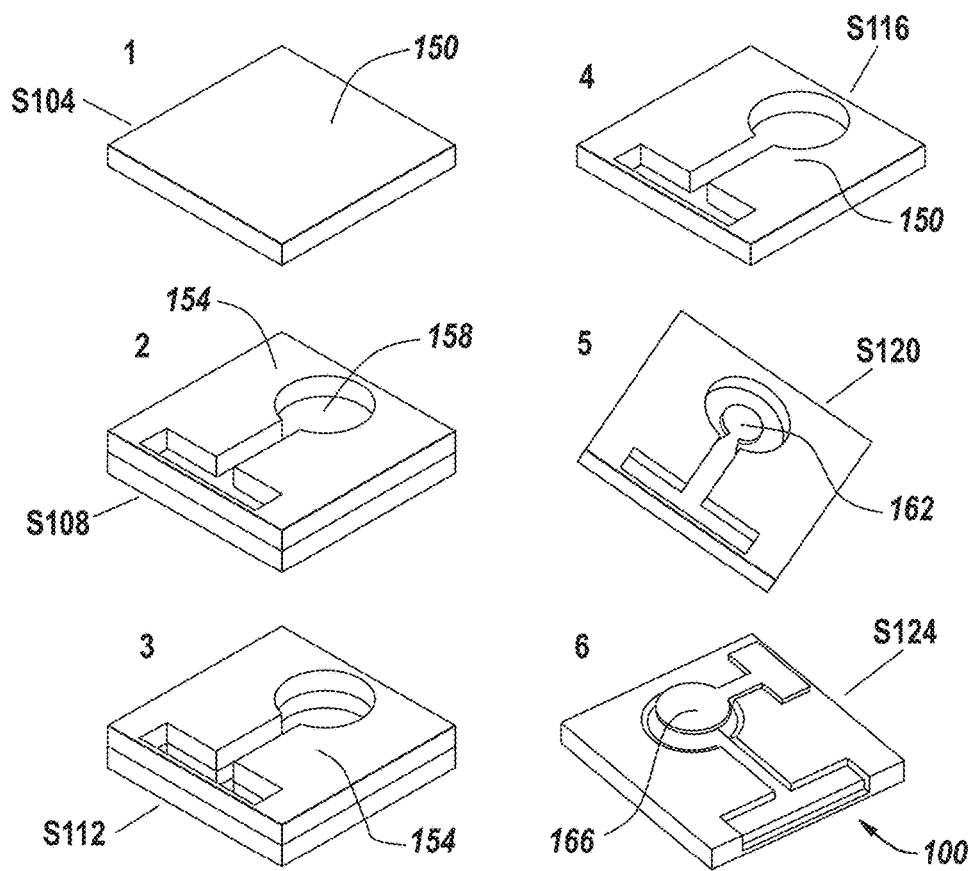
FIG. 1 is a schematic illustration of an exemplary method for the fabrication of pressure sensors, according to an illustrative embodiment.

Turning now to FIG. 1, the steps used for fabricating a pressure sensor 100, according to an illustrative embodiment, are shown. The sensor 100 is a microelectromechanical systems (MEMS) device made by micromachining techniques, which may include depositing, patterning, etching, wafer bonding, and/or wafer thinning a series of layers on a common substrate. In other embodiments, alternative methods and combinations of steps can be used. The sensor fabrication starts (step S104) with a 100 µm thick AT-cut quartz substrate 150. The substrate 150 is patterned (step S108) with a nickel hard mask 154 having a 1 mm diameter membrane 158 and etched (step S112) to a depth of about 63 µm (for 45 MHz resonator) and about 80 µm (for 82 MHz resonator) with a reactive ion etch (RIE) process using $SF_6$ and $NF_3$ plasmas. The nickel mask 154 is then stripped (step S116) using aqua regia, a mixture of hydrochloric acid and nitric acid A bottom gold electrode 162 is deposited and patterned using a photolithographic process (step S120). A top gold electrode 166 is deposited and patterned using a photolithographic process (step S124). The sensor 100 is then packaged into a modified ceramic package (not shown) with a hole cut in the bottom. The sensor 100 is attached to the package using RTV silicone to create a hermetic seal between the two faces of the diaphragm to minimize packaging stress. A fixture is used to form compression seals (not shown) on both faces of the ceramic using O-rings. Both sides of the package are then connected to separate pressure reservoirs (not shown).

Figure 2:
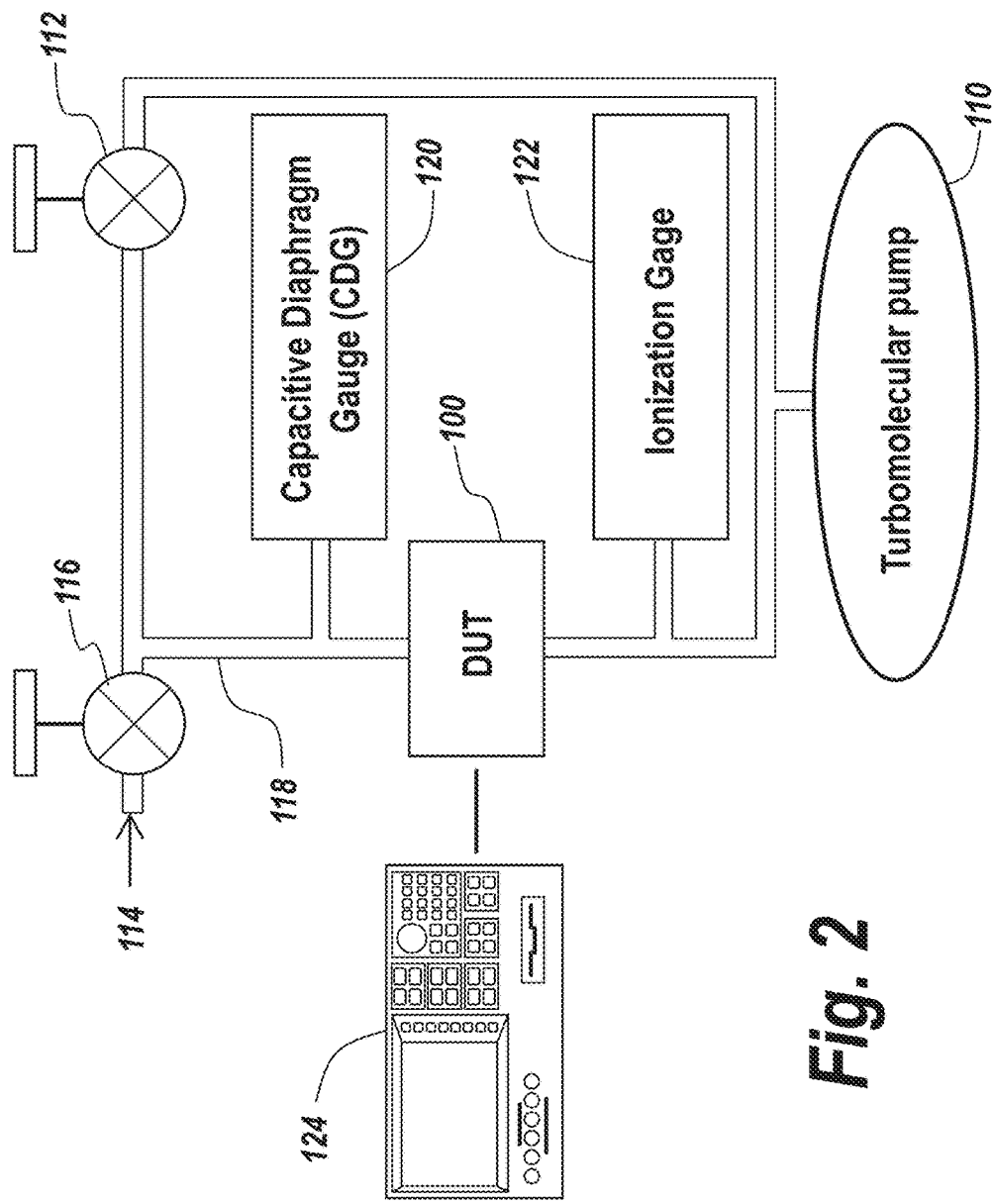
FIG. 2 is a schematic illustration of an experimental setup for testing pressure sensors.

As illustrated in FIG. 2, in order to test the sensor 100, a turbomolecular pump 110 is connected to the two sides of the sensor 100 (noted as DUT—Device Under Test) and used to reduce the pressure to a reference pressure of ≤0.08 mTorr. The two sides of the sensor 100 are isolated by closing an isolation valve 112 after reaching the reference pressure. One side of the sensor 100 is pumped at high vacuum to maintain the reference pressure. Then, a controlled amount of high pressure nitrogen gas 114 is introduced into the sensor 100 facing the other side of the resonator diaphragm 118 using a needle valve 116. The test pressure is continuously monitored using a calibrated capacitance diaphragm gauge (CDG) 120 and an ionization gage 122 for pressures below 100 µTorr. The quartz resonance frequency and at-resonance susceptance characteristics are monitored using an impedance analyzer 124.

Figure 3A:
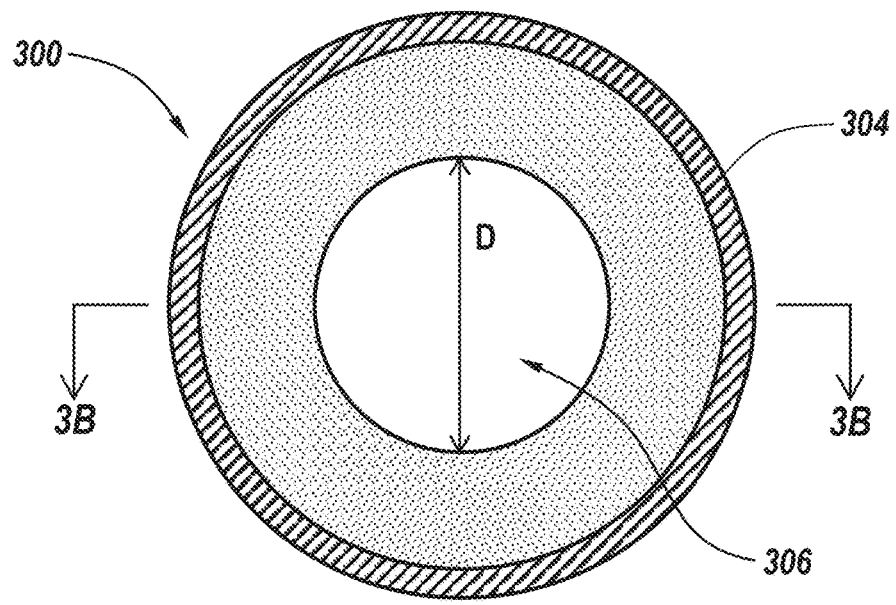
FIG. 3A is a schematic illustration of a quartz pressure sensor, according to an illustrative embodiment.

FIG. 3A is a plan (top) view of the quartz sensor 300, according to another illustrative embodiment of this disclosure. As shown in FIG. 3A, the sensor 300 is anchored to a fixture around the circumference at an anchor area 304. In one embodiment, the sensor 300 is anchored by bonding the sensor 300 around its periphery using silicone rubber cement. The sensor 300 is then thinned down in the middle region 306 using a dry etch (or other) process to the desired thickness (t) (FIG. 3B) and diameter (D).

Figure 3B:
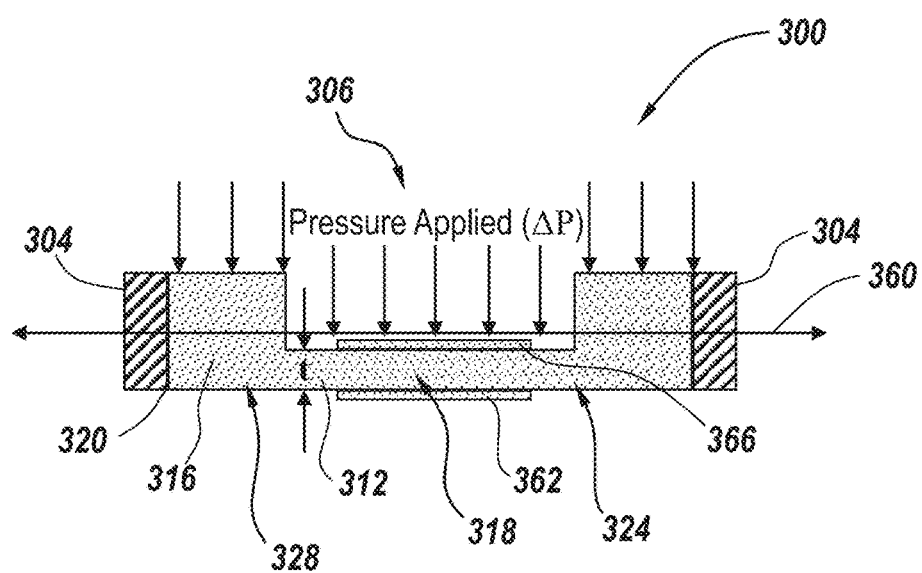
FIG. 3B is a cross sectional view of the quartz pressure sensor of FIG. 3A

FIG. 3B is a cross sectional view of the sensor 300 of FIG. 3A. As shown in FIG. 3B, the sensor 300 has a diaphragm 318 having a top electrode 366 and a bottom electrode 362. As a result of the dry etching process, the sensor 300 also has a thinned region 312 of the diaphragm 318 that separates two regions that have different pressures (top and bottom of the sensor 300 with respect to FIG. 3B). One face 324 of the thinned region 312 is coplanar with a face 328 of the full thickness region 316 of the diaphragm 318. The bi-directional behavior of the sensor 300 arises due to the combination of the dimensional relationship between the thinned region 312 and the full thickness region 316, and the boundary condition at the edge of 320 of the full thickness region 316.

Still referring to FIG. 3B, the diaphragm 318 is thinner in the thinned region 312 than in the full thickness region 316 such that the planar structure in the thinned region 312 is displaced relative to the neutral axis 360 of the planar structure. In embodiments, while undergoing bending, the planar structure in the thinned region 312 has mostly compressive or mostly tensile stress (also, as illustrated in FIG. 8). In alternative embodiments, the planar structure in the thinned region 312 is displaced relative to the neutral axis 360 of the planar structure such that, while undergoing bending, the thinned region 312 does not undergo symmetric levels of compressive stress and tensile stress at the same time. In such embodiments, the sensor 300 would still exhibit the desired bi-directional behavior described herein. However, the effect could be obtained by other construction methods. For example, a uniformly thick diaphragm 318 that is bonded to a thicker surrounding substrate or support would show the effect as long as the assembly results in an equivalent mechanical construction (including bending stiffness, stress states, and neutral axis geometry). The net bending moment experienced by the diaphragm 318 due to the pressure difference across it induces a shift in the resonance frequency and can be sensitively monitored by the changes in the at-resonance impedance characteristics of the sensor 300 (see FIG. 4) as measured using the electrodes 362, 366. Thus, the sensor 300 advantageously exploits the force-frequency effect to span a large operational pressure range with high resolution.

Figure 4:
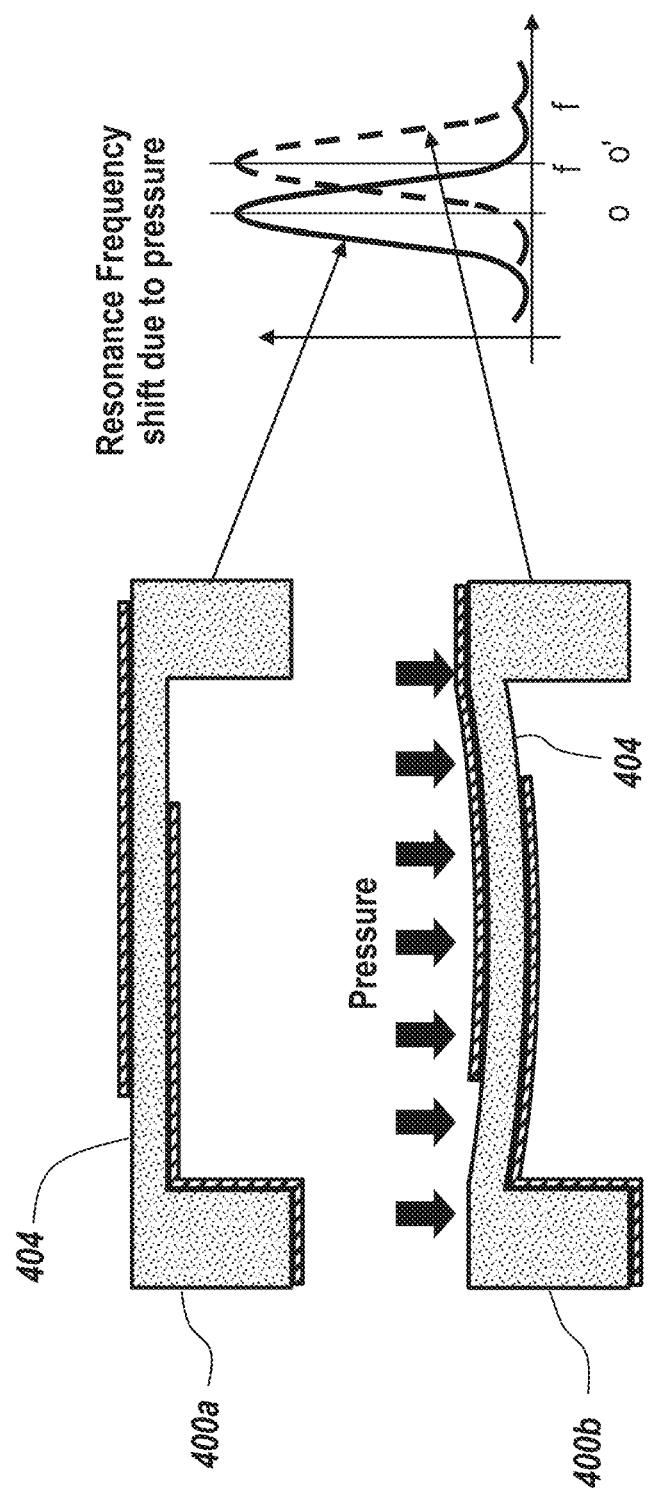
FIG. 4 is a schematic illustration of a quartz pressure sensor, according to an illustrative embodiment.

FIG. 4 is a schematic illustration of a sensor 400a with no pressure difference across the diaphragm 404, and a sensor 400b with a pressure difference across the diaphragm 404. In order for a piezoelectric material diaphragm to be effectively used as a pressure sensor, it is necessary for the sensor to have a good resonator structure, a diaphragm with sufficient pressure deflection, and a sufficient coupling gain between deflection and frequency to achieve the needed sensitivity. The design requirements for getting a quartz crystal to resonate well constrain the dimensions and aspect ratio of the desired quartz crystal. Further, in order to get high electrical read-out resolution, the resonant frequency range must be appropriately high. In addition, in order to measure very low pressures (i.e., high vacuum), the pressure-deflection to Δf gain must be very high.

Notably, the use of micromachining techniques in the fabrication of the sensors of this disclosure enables the sensors to not only exhibit good resonator characteristics, but also achieve measurable frequency resolution in a high vacuum regime. Without the use of micromachining, sensors with resolution in the high vacuum regime cannot be achieved. In non-micromachined fabricated sensors, the resonant diaphragm diameter (D) would be restricted to approximately the 1-10 centimeter range. The diaphragm thickness (t) would be restricted to the fractional millimeter range or higher. These dimensional constraints would limit the resonator to frequencies on the order of 10 MHz, which would not allow sufficient resolution for high vacuum use. A 10 MHz resonator would have lower sensitivity and high noise and therefore would not provide the desired resolution to resolve pressure in a high vacuum regime. The resolution of the resonator increases as the frequency is increased. In order to resolve the frequency of the signal during measurements requires a finite number of cycles. Therefore, a resonator running at a higher frequency will achieve the desired number of cycles more quickly. By using micromachining techniques, the diameter of the sensor can be fabricated to be approximately one centimeter or less, and the thickness can be reduced to the micron range or below. These types of dimensions allow the sensor resonant frequency to be in the 100 MHz or higher range. This frequency range provides a desirable signal-to-noise ratio of the resonant frequency measurement. More importantly, these dimensions yield an increase in the pressure deflection gain, which is equivalent to an increase in sensitivity of 500-1000 times. This improvement provides the sensitivity needed to resolve very low pressures in the microTorr range.

Figure 5:
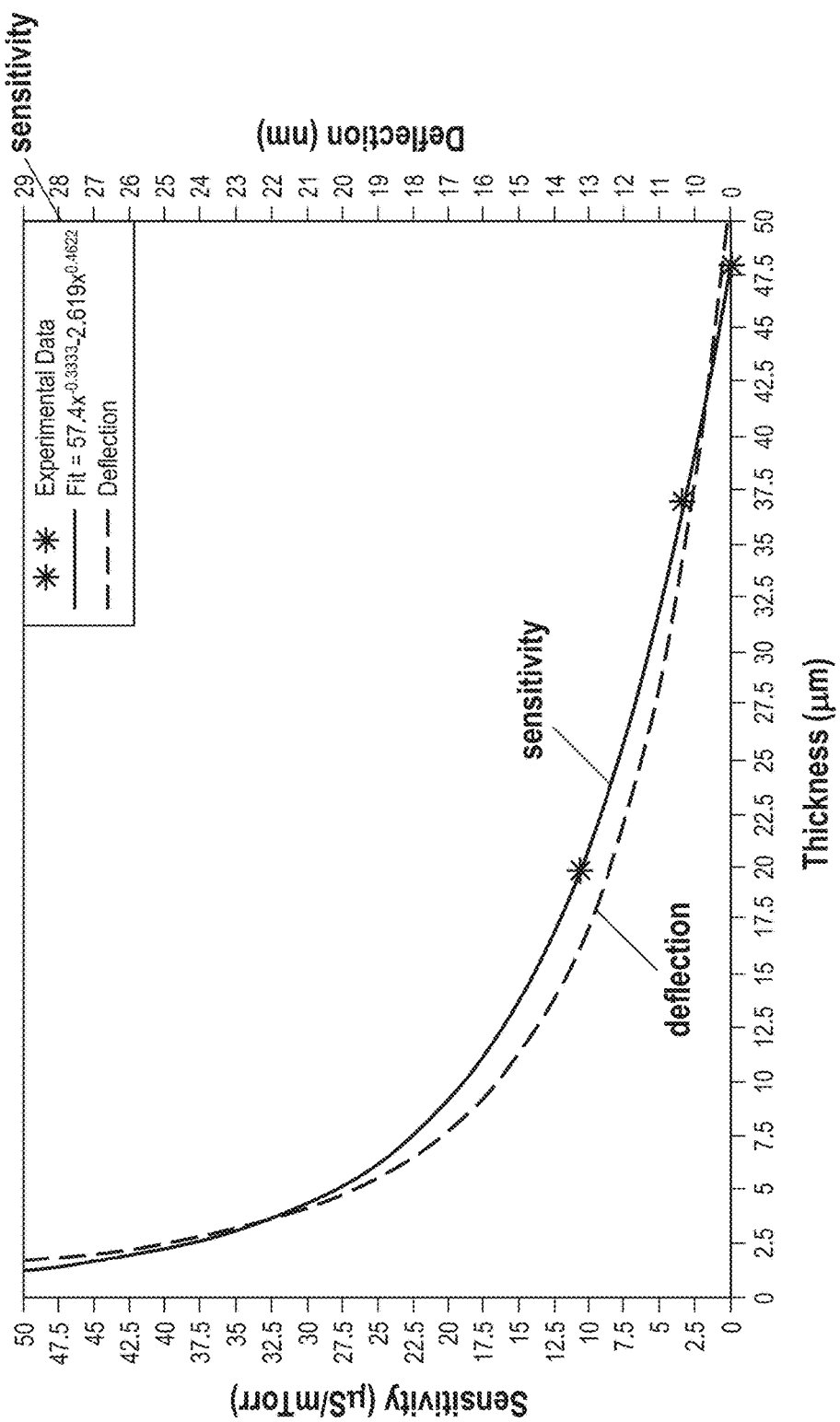
FIG. 5 is a plot of sensitivity and deflection of a quartz sensor as a function of the thickness of the sensor's diaphragm, according to an illustrative embodiment.
Figure 6:
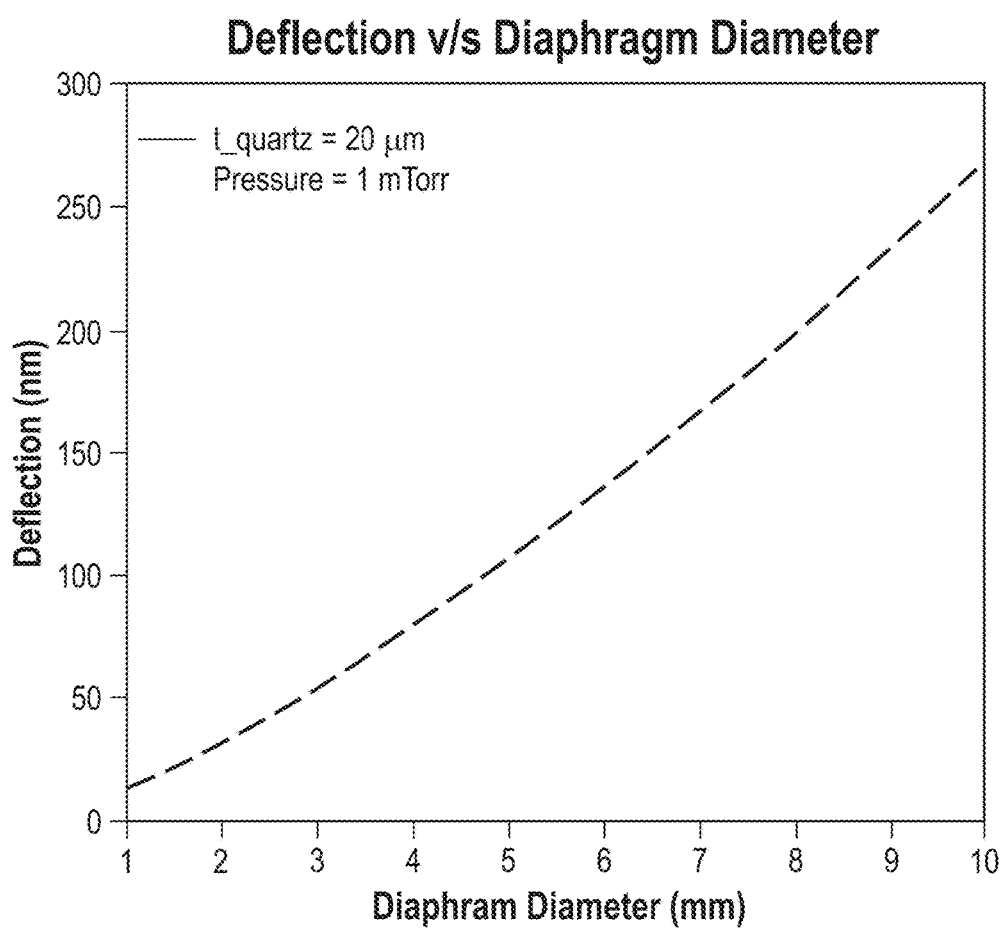
FIG. 6 is a plot of deflection of a quartz sensor as a function of the diameter of the sensor's diaphragm, according to an illustrative embodiment.

FIGS. 5 and 6 show the design space that can be achieved by micromachining, which allows improved sensitivity and thus operation in the microTorr range. FIG. 5 is a plot of sensitivity (left axis) and deflection (right axis) of a sensor as a function of the thickness of the sensor's diaphragm. The sensitivity of the sensor increases more quickly for thicknesses below about 20 microns. Sensitivity is equal to susceptibility (μS)/pressure (mTorr). In FIG. 5, change in susceptibility is the output signal and is equivalent to a change in resonant frequency of the resonator. FIG. 6 is a plot of deflection of a sensor as a function of the diameter of the sensor's diaphragm.

As stated above, applying a pressure differential across the thickness of the sensors of this disclosure creates an edge boundary having a non-symmetric effect on the stress state of the diaphragm. FIG. 7A shows a uniformly thick diaphragm 718 being deflected by a pressure on the lower and upper faces of a non-etched sensor 700. This results in symmetry of the stress and thus the shift in resonance frequency of the sensor 700. The dashed line represents the neutral plane 704 of the total structure of the sensor 700. The black area indicates tensile stress and the light grey area indicates compressive stress (e.g., black area on top of the sensor 700 in FIG. 7B and light grey area on the bottom of FIG. 7B). With respect to FIG. 7A-C, the neutral plane 704 is located at the centerline of the full thickness region 716. This results in a symmetric transition from compressive to tensile stress through the thickness of the diaphragm 718 as shown in FIG. 7B for a net pressure from below and FIG. 7C for a net pressure from above. In this case, the net frequency shift is the same (magnitude and sign) in either pressure direction.

FIG. 8A shows a non-uniformly thick diaphragm 818 (e.g., sensor 300 of FIG. 3A) being deflected by a pressure on the lower and upper face. The dashed line represents the neutral plane 804 of the total structure of the sensor 800. The deflection and stress are not symmetric through the thickness of the sensor. In the embodiment in FIG. 8A, the flexible, thin portion 812 of the diaphragm 818 is located away from the overall neutral plane 804. As a consequence, the diaphragm 818 is mostly tensile for a net pressure from below, as shown in FIG. 8B, and mostly compressive for a net pressure from above, as shown in FIG. 8C. This stress asymmetry produces a transition between mostly compressive to mostly tensile stress states. This causes a frequency shift of the quartz resonator producing a bi-directional output. In addition, the mechanical boundary conditions (at the locations marked "anchors") of the full thickness layer 816 have an effect on the net positions of the overall neutral axis 804 as compared to the centerline of the thinned diaphragm region 812. To get the largest magnitude of the effect, these boundary conditions would need to be appropriately designed to accentuate the distance between the overall neutral axis 804 and the centerline of the thinned diaphragm region 812. The bi-directional output is a function of the non-symmetric construction of the sensor 800 as described above. In particular, the thinned portion 812 of the diaphragm 818 must be thin compared to the neutral axis 804 of the total structure of the sensor 800, as shown in FIG. 8.

Figure 9:
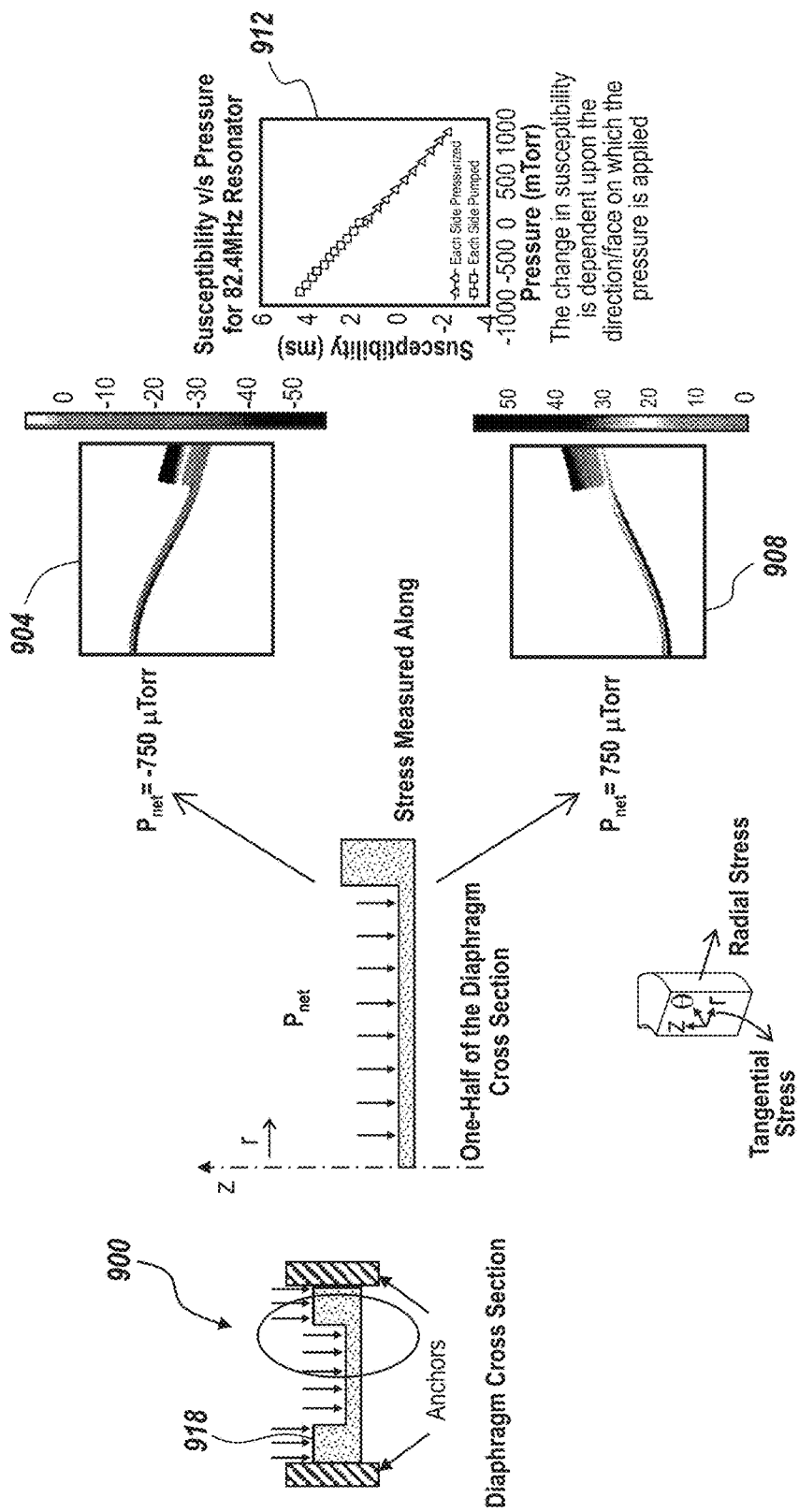
FIG. 9 is a schematic illustration of simulation and experimental results that illustrate the bi-directional effect of a quartz sensor, according to an illustrative embodiment.

FIG. 9 provides simulation results that illustrate the bi-directional effect of the sensor 900 according to an illustrative embodiment, representing an 82.4 MHz resonator. A downward pressure (represented by downward facing arrows in FIG. 9) induces an average tensile stress in the diaphragm 918, as shown in the stress magnitude image 908. This stress state causes the frequency (and susceptibility) to decrease as shown in the "etch side pressurized" portion of the Susceptibility versus Pressure plot 912. Similarly, an upward pressure induces an average compressive stress in the diaphragm 918, as shown in the stress magnitude image 904. This stress state causes the frequency (and susceptibility) to increase, as shown in the "etch side pumped" portion of the Susceptibility versus Pressure plot 912. The Susceptibility versus Pressure plot 912 clearly shows the bi-directional effect as the pressure transitions from net upward (904) to net downward (908).

Figure 10:
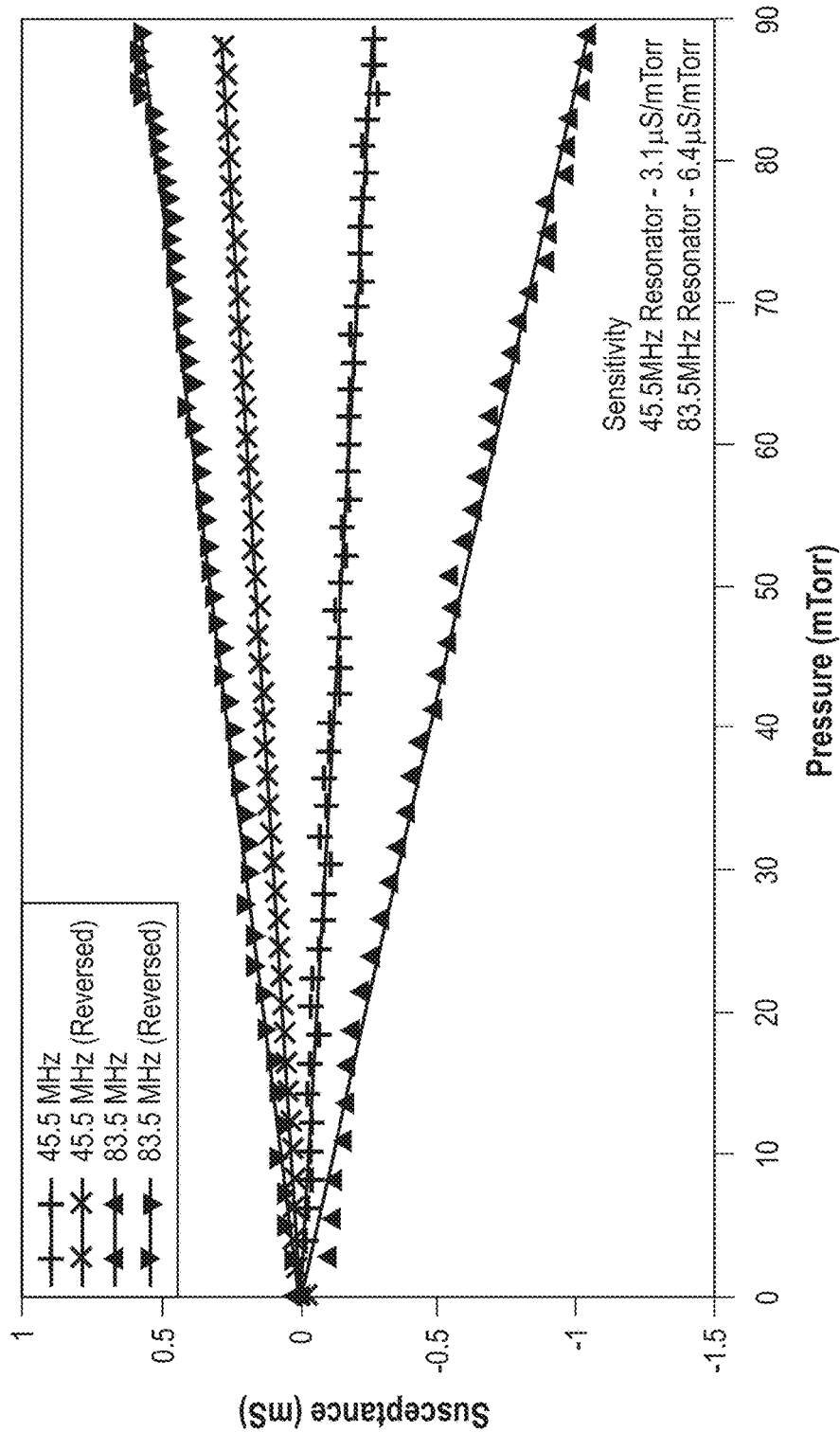
FIG. 10 is a plot of the change in susceptance for several quartz sensors illustrating the principles of the embodiments described herein.

FIG. 10 is a plot of the at-resonance susceptance change for several quartz sensors having the structure described above with respect to the sensor 300 of FIGS. 3A and 3B. The X-axis of the plot is pressure differential applied across the diaphragm 318 of the sensor 300 in units of mTorr. The Y-axis is the measured change in at-resonance susceptance in units of mS. The bidirectional sensing capability of the resonator diaphragm 318 is illustrated by the sign of the at-resonance susceptibility change of the resonator as function of both the magnitude and the sign of the pressure. This behavior may be attributed to the reversal of the stress directions. FIG. 10 shows the range of operation of two sensors 300.

While the description includes specific embodiments, it should be understood by those skilled in the art that various changes in form and detail may be made therein without departing from the spirit and scope of the invention as defined by the appended claims.

What is claimed is:

1. A pressure sensor, comprising:
   a piezoelectric substrate having a generally planar structure and a neutral axis, an upper electrode on the planar structure and a lower electrode on the planar structure to drive the resonance of the piezoelectric substrate and sense the frequency of the piezoelectric substrate;
   an anchor location fixing the piezoelectric substrate to a fixture at the periphery of the planar structure of the piezoelectric substrate;
   wherein the planar structure of the piezoelectric substrate has a first region having a first characteristic thickness adjacent to the anchor location, and a second region have a second characteristic thickness at a middle region of the substrate,
   wherein the second characteristic thickness is less than the first characteristic thickness such that the planar structure in the second region is configured to be displaced relative to the neutral axis of the planar structure when pressure is directly applied to the piezoelectric substrate perpendicular to the neutral axis such that, while undergoing bending, the second region has either mostly compressive or mostly tensile stress, and
   wherein the pressure range of the pressure applied to the piezoelectric substrate is between one atmosphere and $10^{-6}$ Torr.

2. The sensor of claim 1, wherein the sensor is fabricated using micromachining technology.

3. The sensor of claim 1, wherein the substrate is an AT-cut quartz substrate.

4. The sensor of claim 1, wherein the upper electrode comprises gold.

5. The sensor of claim 1, wherein the lower electrode comprises gold.

6. The sensor of claim 1, wherein the substrate is fixed to the fixture using silicone rubber cement.

7. The sensor of claim 1, wherein the second region is formed by a dry etch process.

8. The sensor of claim 1, wherein a diameter of the second region is equal to or less than 1 cm.

9. The sensor of claim 1, wherein the second characteristic thickness of the second region is less than about 100 μm.

10. The sensor of claim 1, wherein the sensed frequency is equal to or greater than 100 MHz.

11. The sensor of claim 1, wherein the sensor is a MEMS device.

12. A bulk acoustic wave resonator pressure sensor including a diaphragm, the diaphragm comprising:
    a substrate having a generally planar structure and a neutral axis, the planar structure including a first surface and a second surface opposite the first surface, a portion of the first surface being etched to a pre-selected depth;
    a first electrode deposited and patterned on the first surface;
    a second electrode deposited and patterned on the second surface;
    wherein the first and second electrodes are configured to measure changes in an at-resonance impedance characteristic of the pressure sensor when pressure is directly applied to one of the first surface or the second surface perpendicular to the neutral axis, and
    wherein the pressure range applied to the substrate is between one atmosphere and $10^{-6}$ Torr.

13. The sensor of claim 12, wherein the substrate is an AT-cut quartz substrate.

14. The sensor of claim 12, wherein a thickness of an unetched portion of the substrate is about 100 μm.

15. The sensor of claim 12, wherein the pre-selected etch depth is about 63 μm.

16. The sensor of claim 12, wherein the pre-selected etch depth is about 80 μm.

17. The sensor of claim 12, wherein the first and second electrodes comprise gold.

18. The sensor of claim 12, wherein the first and second electrodes are deposited and patterned using a photolithographic process.

19. The sensor of claim 12, wherein the sensor is fabricated using micromachining technology.

20. The sensor of claim 12, wherein pressure applied to the first and second surfaces causes deflection and stress of the diaphragm, the deflection and stress being non-symmetric through a thickness of the diaphragm.

21. The sensor of claim 12, wherein the diaphragm is mostly tensile for a net pressure applied to the second surface, and mostly compressive for a net pressure applied to the first surface.

22. The sensor of claim 12, wherein the sensor is a MEMS device.

\* \* \* \* \*